(12) United States Patent
Fujii (10) Patent No.: US 9,616,537 B2
(45) Date of Patent: Apr. 11, 2017

(54) CONVEYING APPARATUS WITH DOUBLE-SPEED MECHANISMS

(71) Applicant: HITACHI ZOSEN FUKUI CORPORATION, Awara-shi, Fukui (JP)

(72) Inventor: Syoichiro Fujii, Awara (JP)

(73) Assignee: Hitachi Zosen Fukui Corporation, Awara-Shi, Fukui (JP)

( * ) Notice: Subject to any disclaimer, the term of this patent is extended or adjusted under 35 U.S.C. 154(b) by 0 days.

(21) Appl. No.: 14/382,283

(22) PCT Filed: Mar. 1, 2013

(86) PCT No.: PCT/JP2013/001269
§ 371 (c)(1),
(2) Date: Aug. 29, 2014

(87) PCT Pub. No.: WO2013/128942
PCT Pub. Date: Sep. 6, 2013

(65) Prior Publication Data
US 2015/0071740 A1 Mar. 12, 2015

(30) Foreign Application Priority Data
Mar. 2, 2012 (JP) .................................. 2012-046193

(51) Int. Cl.
*B65G 47/90* (2006.01)
*B23Q 7/00* (2006.01)
(Continued)

(52) U.S. Cl.
CPC ............. *B23Q 7/003* (2013.01); *B21D 43/05* (2013.01); *B25J 15/0052* (2013.01); *B65G 25/06* (2013.01); *B65G 47/907* (2013.01)

(58) Field of Classification Search
CPC .. B25J 15/0052; B65G 47/901; B65G 47/907; B21D 43/05; B21D 43/052; B21D 43/055; B21D 43/10; B21D 43/105
(Continued)

(56) References Cited

U.S. PATENT DOCUMENTS 4,770,598 A * 9/1988 Kotani ........................ 414/752.1
7,040,853 B2 * 5/2006 Harsch et al. ............. 414/749.1
(Continued)

FOREIGN PATENT DOCUMENTS

JP   58-066045 U    5/1983
JP   62-227534 A    10/1987
(Continued)

*Primary Examiner* — Gerald McClain
(74) *Attorney, Agent, or Firm* — Muncy, Geissler, Olds & Lowe, P.C.

(57) ABSTRACT

A conveying device provided with a pair of shift frames arranged so as to be orthogonal to an advancing direction of a work piece, a pair of feed frames arranged so as to be orthogonal to the shift frames, double-speed mechanisms attached to the feed frames, and grasping mechanisms attached to the double-speed mechanisms. Additionally, the device has feed frames that are slidable relative to the shift frames, and double-speed mechanisms that are slidable to the feed mechanisms. The transportation apparatus also has a fast operating speed and reduces the interference region with a press apparatus as small as possible is provided.

5 Claims, 5 Drawing Sheets

(51) Int. Cl.
*B25J 15/00* (2006.01)
*B21D 43/05* (2006.01)
*B65G 25/06* (2006.01)

(58) Field of Classification Search
USPC .......... 414/222.09, 222.11, 222.12, 226.01;
72/405.13, 405.14, 405.16
See application file for complete search history.

(56) References Cited

U.S. PATENT DOCUMENTS

| 7,410,046 B2* | 8/2008 | Shiroza .................. 198/468.4 |
| 2007/0137505 A1* | 6/2007 | Heid et al. .................. 72/419 |

FOREIGN PATENT DOCUMENTS

| JP | 2003-200231 A | 7/2003 |
|----|---------------|--------|
| JP | 2003-205330 A | 7/2003 |
| JP | 2006-305632 A | 11/2006 |
| JP | 2007-000922 A | 1/2007 |
| JP | 2007-136535 A | 6/2007 |
| JP | 2007136535 A * | 6/2007 |

* cited by examiner

CONVEYING APPARATUS WITH DOUBLE-SPEED MECHANISMS

CROSS REFERENCE TO RELATED APPLICATIONS

This application is a national stage of International Application No.: PCT/JP2013/001269, which was filed on Mar. 1, 2013, and which claims priority to JP2012-046193 which was filed on Mar. 2, 2012, and which are both herein incorporated by reference.

TECHNICAL FIELD

The present invention relates to a transportation apparatus, and more specifically, to a transportation apparatus which has a fast operating speed and can make an interference region with a press apparatus as small as possible.

BACKGROUND ART

In a transfer press line, as an apparatus for feeding a work, a transportation apparatus which slides feed frames is generally used.

As such a transportation apparatus, there are a three-dimensional transfer system and a loader/unloader system.

For example, as the three-dimensional transfer system, a transfer feeder provided with a feed carrier having a feed bar coupled to the feed carrier such that the feed bar is movable in a vertical direction and in left and right directions and is restricted regarding movement of front and rear directions, and a feed unit moving the feed carrier in the front and rear directions is known (for example, see PTL 1).

Further, a feed bar driving apparatus of a transfer press having a carrier base which supports and guides a feed bar movably in a work-feeding direction via a linear guide, a linear motor being arranged and configured between the feed bar and the carrier base, and the feed bar being driven by the linear motor is known (for example, see PTL 2).

On the other hand, as the loader/unloader system, a system including an automatic transportation apparatus set at an inlet of an inline apparatus and performing automatic feeding at the uppermost stream of the line and another automatic transportation apparatus set at an outlet of the inline apparatus and automatically discharging a work to the next step is generally known.

CITATION LIST

Patent Literature

PTL 1: Japanese Utility Model Application Laid-Open No. Sho58-66045
PTL 2: Japanese Patent Application Laid-Open No. 2006-305632

SUMMARY OF INVENTION

Technical Problem

However, the three-dimensional transfer systems described in the above PTLs 1 and 2 have such a defect that a feed stroke is short and an operating speed is slow.

Further, in the loader/unloader system, there is such a defect that since an apparatus body advances into a region within a press apparatus, an interference region with a die or the like in the press apparatus (a region including a possibility of collision) expands.

Therefore, a cycle time required cannot be realized.

The present invention has been made in view of the above circumstances, and an object thereof is to provide a transportation apparatus which has a fast operating speed and can make an interference region with a press apparatus as small as possible.

Solution to Problems

As a result of an earnest investigation for solving the above problem, the present inventor has found that the above problem can be solved by using a three-dimensional transfer system having a narrow interference region as a base and attaching a double-speed mechanism to each of feed frames, and has completed the present invention.

The present invention lies in (1) a transportation apparatus including: a pair of shift frames arranged so as to be orthogonal to an advancing direction of a work; a pair of feed frames arranged so as to be orthogonal to the shift frames; double-speed mechanisms attached to the feed frames, respectively; and grasping means attached to the double-speed mechanisms, respectively, wherein the feed frames are slidable to the shift frames, and the double-speed mechanisms are slidable to the feed mechanisms.

The present invention lies in (2) the transportation apparatus described in the above item (1), wherein the double-speed mechanisms each include a low-speed movable frame slidable to the feed frame, pulleys attached to both ends of the low-speed movable frame, a belt provided so as to extend between both the pulleys and having both ends fixed to the feed frame, a high-speed movable frame attached to the belt, and a driving means for sliding the low-speed movable frame, and wherein the grasping means is provided on the high-speed movable frame.

The present invention lies in (3) the transportation apparatus described in the above item (2), wherein the driving means is a rack and pinion apparatus.

The present invention lies in (4) the transportation apparatus described in any one of the above items (1) to (3), wherein the shift frames are slidable in a vertical direction.

The present invention lies in (5) the transportation apparatus described in the above item (4), wherein slides of the feed frames, the shift frames, and the double-speed mechanisms are performed by servo-motor drive.

The present invention lies in (6) the transportation apparatus described in any one of the above items (1) to (5), wherein a work which has been heated by a heating means is transported to a press apparatus arranged between the heating means and a cooling means, and a work which has been pressed by the press apparatus is transported to the cooling means.

The present invention lies in (7) the transportation apparatus described in the above item (6), wherein the work is pressed inside the feed frames and the shift frames.

Advantageous Effects of Invention

In the transportation apparatus of the present invention, by adopting the three-dimensional transfer system provided with a pair of shift frames arranged so as to be orthogonal to an advancing direction of a work and a pair of feed frames arranged so as to be orthogonal to the shift frames, the feed frames being slidable to the shift frames, an interference region with a press apparatus or the like can be made as small as possible, and a compact installation can be adopted.

In addition thereto, in the above-described transportation apparatus, since the double-speed mechanisms are attached to the feed frames, respectively, and the double-speed mechanisms are slidable to the freed frames, an operating speed can be made fast.

From these matters, according to the above-described transportation apparatus, it becomes possible to make the interference region as narrow as possible and realize a desired cycle time.

For example, when the double-speed mechanism is composed of a low-speed movable frame, pulleys attached to both ends of the low-speed movable frame, a belt provided so as to extend between both the pulleys and having both ends fixed to the feed frame, a high-speed movable frame attached to the belt, and a driving means for sliding the low-speed movable frame, the high-speed movable frame can be slid at a speed of two times the speed of the low-speed movable frame by sliding the low-speed movable frame.

At this time, it is preferable that the driving means is a rack and pinion apparatus.

In this case, arrangement can be made possible even in a narrow space.

In the transportation apparatus of the present invention, when the shift frame is movable in a vertical direction, a work can be lifted up.

Further, it is possible to move the transportation apparatus vertically in response to a shape of a die or the like.

From these matters, it becomes possible to transport a work efficiently without scratching the work.

In the transportation apparatus of the present invention, when slides of the feed frame, the shift frame, and the double-speed mechanism are performed by servo-motor driving, speeds of the slides, and distances of the slides can be set precisely.

Further, a synchronism operation, an individual operation, a free motion setting and the like can be made possible.

The transportation apparatus of the present invention can be used suitably when a work which has been heated by a heating means is transported to a press apparatus arranged between the heating means and a cooling means, and when a work which has been pressed by a press apparatus is transported to the cooling means.

DESCRIPTION OF EMBODIMENTS

A preferred embodiment of the present invention will be described below in detail with reference to the drawings, if necessary.

It should be noted that same elements are attached with same reference signs and repeated explanations thereof are omitted.

Further, a positional relationship such as up and down, and left and right is based upon a positional relationship shown in the figures, unless otherwise noted.

In addition, size ratios on the drawings are not limited to the illustrated ratios.

Figure 1:
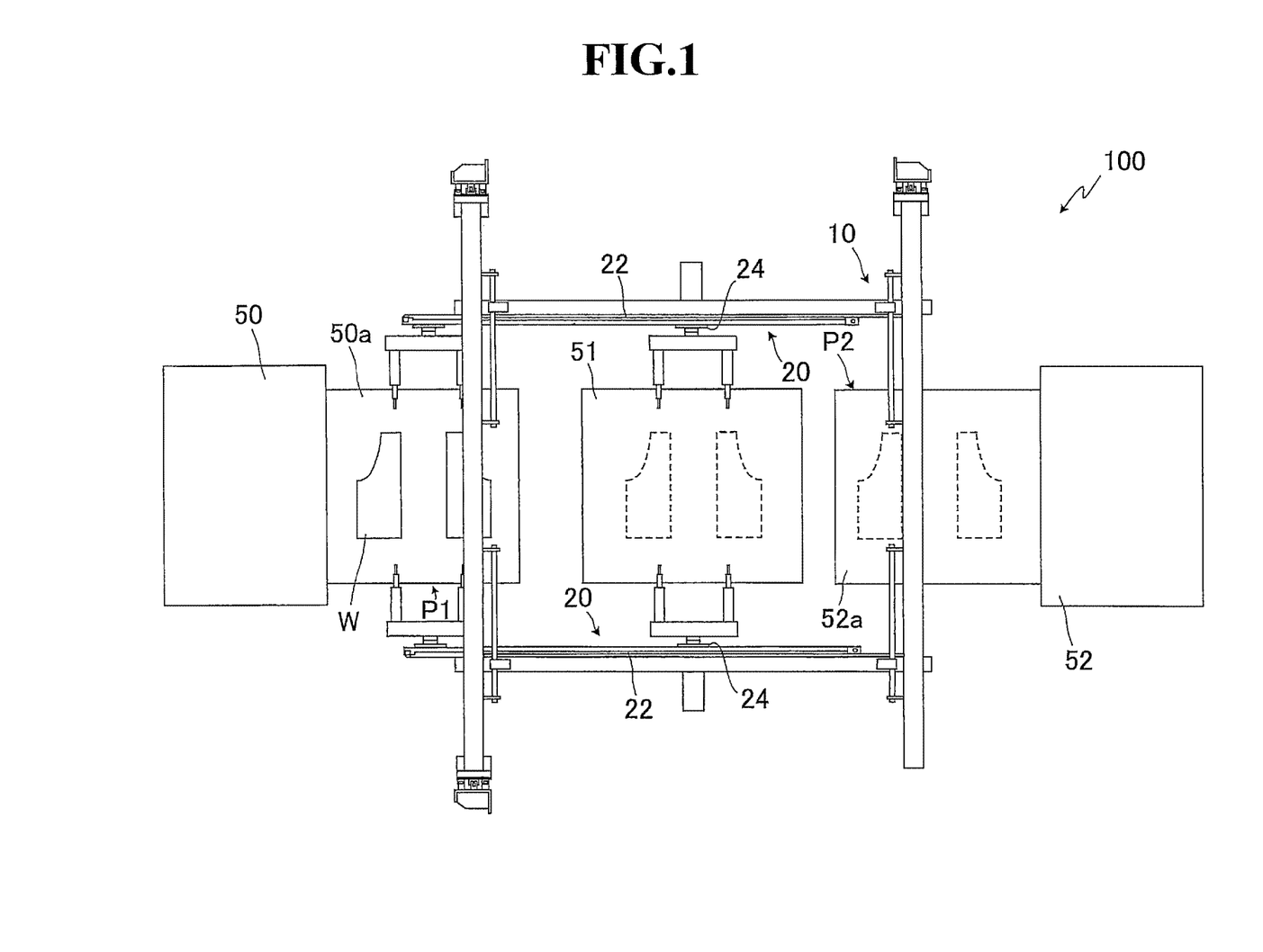
FIG. 1 is a top view showing a press mechanism for a work including a transportation apparatus according to this embodiment.

FIG. 1 is a top view showing a press mechanism for a work including a transportation apparatus according to this embodiment.

As shown in FIG. 1, in a press mechanism 100 for a work W, a transportation apparatus 10 according to this embodiment is attached so as to surround a press apparatus 51 arranged between a heating furnace 50 and a cooling apparatus 52.

That is, the transportation apparatus 10 is attached so as to surround the press apparatus 51 arranged on the downstream side of the heating furnace 50 and on the upstream side of the cooling apparatus 52.

The transportation apparatus 10 according to this embodiment is an apparatus which transports a work W from the heating furnace 50 to the press apparatus 51 and transports the work W after pressed from the press apparatus 51 to the cooling apparatus 52.

Incidentally, the details will be described later.

Figure 2:
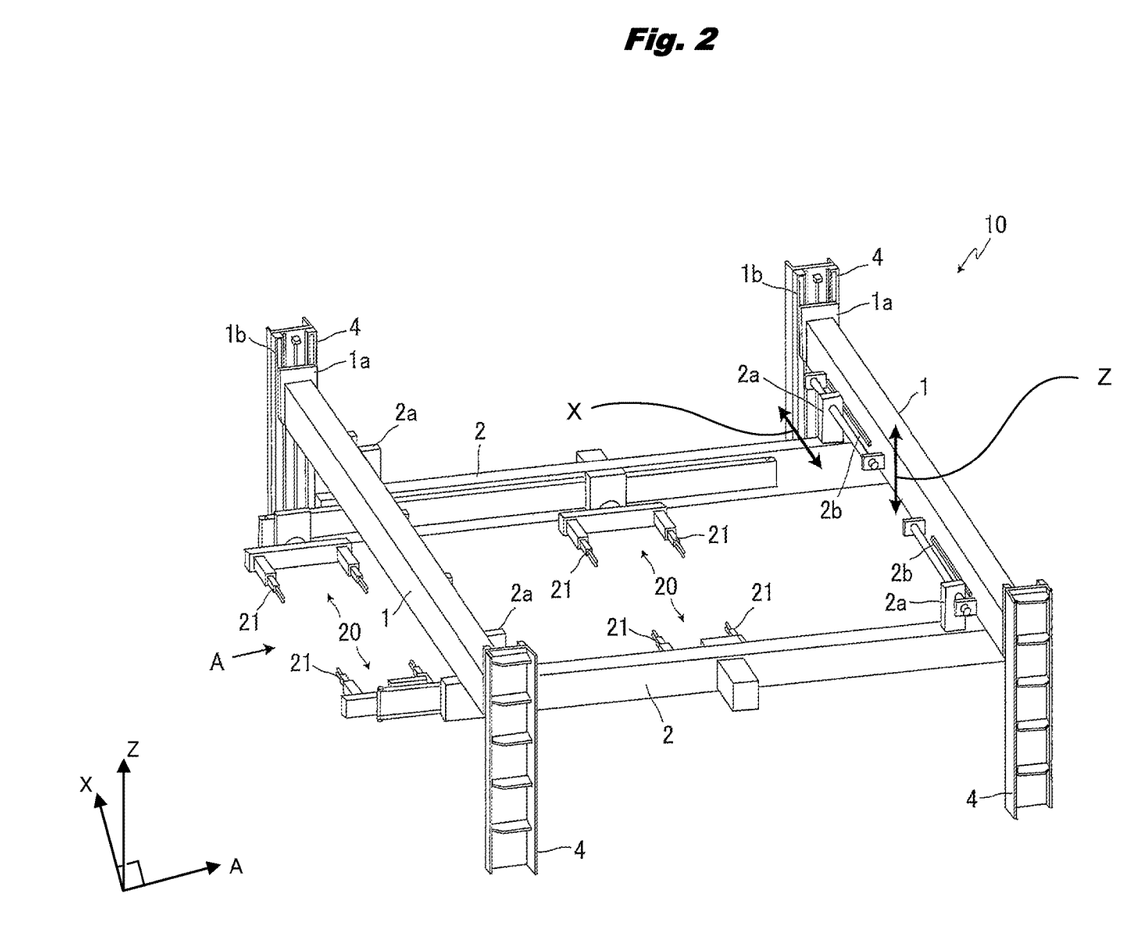
FIG. 2 is a perspective view showing the transportation apparatus according to this embodiment.

FIG. 2 is a perspective view showing the transportation apparatus according to this embodiment.

As shown in FIG. 2, the transportation apparatus 10 according to this embodiment is wholly formed in a lattice shape and a press apparatus (not shown) is disposed in a central section of the transportation apparatus 10.

That is, a work is pressed inside a pair of shift frames 1 arranged in parallel with each other and a pair of feed frames 2 similarly arranged in parallel with each other.

Specifically, the transportation apparatus 10 is provided with a pair of front and rear shift frames 1 arranged so as to cross (namely, be orthogonal to) an advancing direction A of a work, a pair of left and right feed frames 2 arranged under the shift frames 1 so as to intersect the shift frames 1 (namely, in the advancing direction of a work), double-speed mechanisms 20 attached to the feed frames 2, respectively, and grasping means 21 attached to the double-speed mechanisms 20, respectively.

First, in the transportation apparatus 10, struts 4 (uprights) are arranged at four corners.

Incidentally, the struts 4 are fixed to the press apparatus, respectively.

The strut 4 is provided with a first rail 1b for sliding the shift frame 1 inside thereof (the side of the press apparatus).

As described above, the two shift frames 1 are arranged with a predetermined spacing therebetween so as to be orthogonal to the advancing direction of a work.

Incidentally, a press section of the press apparatus (not shown) is disposed between both the shift frames 1.

Each shift frame 1 has first guides 1a slidably attached to the first rail 1b of the above strut 4 at both end portions thereof, and has second rails 2b provided for sliding the feed frame 2 inside thereof (the side of the press apparatus).

Each shift frame 1 is made slidable in a vertical direction by attaching the first guides 1a to the first rails 1b of the struts 4.

At this time, the pair of front and rear shift frames 1 are controlled by a servo motor (not shown) and they are slid in a vertical direction in synchronism with each other.

In the transportation apparatus 10 of the present invention, since the shift frames 1 are movable in the vertical direction, a work can be lifted up.

Further, the position of the transportation apparatus 10 can be adjusted vertically in response to the shape of a die exchanged for the next lot in the press apparatus.

Two feed frames 2 are arranged with a predetermined spacing therebetween so as to be parallel with the advancing direction of a work.

Incidentally, the press section of the press apparatus is disposed between both the feed frames 2.

Each feed frame 2 has second guides 2a attachable to the second rails 2b of the above-described shift frames 1 at both ends thereof, and has a double-speed mechanism 20 attached inside thereof (the side of the press apparatus).

From this, each feed frame 2 is made slidable along the shift frames 1 by attaching the feed frame 2 to the shift frames 1 via the second guides 2a and the second rails 2b.

At this time, the pair of feed frames 2 are controlled by a servo motor (not shown) and they are slid in directions reverse to each other in synchronism with each other.

That is, when one shift frame 1 is slid to the side of the press apparatus, the other shift frame 1 is also slid to the side of the press apparatus in synchronism with the sliding of the one shift frame 1, so that a spacing between both the shift frames becomes narrow, and when one shift frame 1 is slid outward, the other shift frame 1 is also slid outward in synchronism with the sliding of the one shift frame, so that the spacing between both the shift frames 1 becomes wide.

Thus, in the transportation apparatus 10 of this embodiment, by adopting the three-dimensional transfer system provided with a pair of shift frames 1 and a pair of feed frames 2, the feed frames 2 being movable relative to the shift frames 1, an interference region with the press apparatus or the like can be made as narrow as possible and a compact equipment can be adopted.

In FIG. 2, the vertical direction in which shift frames 1 are able to slide is shown with arrow Z. The other direction (or horizontal direction) in which feed frames 2 are able to slide is shown with arrow X. When the pair of feed frames approaches, making the gap therebetween narrower, the direction may be referred as inside or inward. The opposite direction may be referred as outside or outward. Since work pieces are transported along the direction indicated with Arrow A, the direction may be referred as transportation direction A. Each of transportation direction A, vertical direction Z, and horizontal direction X is perpendicular to the remaining two of them.

Here, the double-speed mechanism 20 provided in the transportation apparatus 10 will be described.

The double-speed mechanism 20 is attached to each feed frame 2.

That is, the respective double-speed mechanisms 20 are slidably attached to the pair of feed frames 2 so as to face each other.

The double-speed mechanism 20 has a structure where it itself slides relative to the feed frame 2.

Therefore, in the transportation apparatus 10, since the double-speed mechanism 20 is also slid in addition to sliding of the feed frame 2, an operation speed can be made as fast as possible even in the three-dimensional transfer system.

Figure 3:
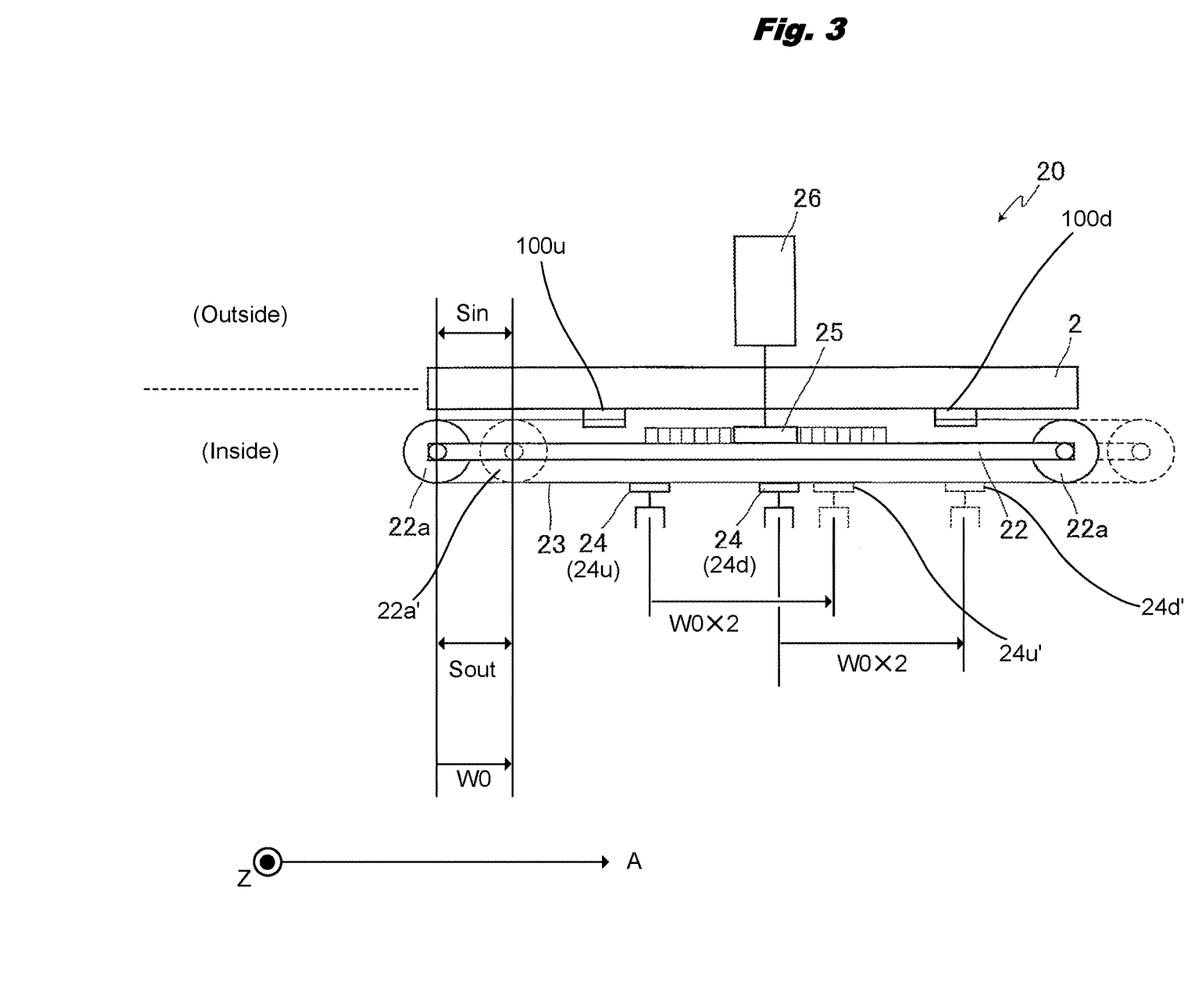
FIG. 3 is an illustrative view for explaining a drive principle of a double-speed mechanism of the transportation apparatus according to this embodiment.

FIG. 3 is an illustrative view for explaining a driving principle of the double-speed mechanism of the transportation apparatus according to this embodiment.

Incidentally, this FIG. 3 does not correspond to FIG. 4 described later necessarily.

As shown in FIG. 3, the double-speed mechanism 20 is composed of a low-speed movable frame 22 slid relative to the feed frame 2, pulleys 22a attached to both ends of the low-speed movable frame 22, a belt 23 provided so as to extend between both the pulleys 22a and having both ends fixed to the feed frame 2, a high-speed movable frame 24 attached to the belt 23 and slid integrally with belt 23, a driving means 25 for sliding the low-speed movable frame 22, and a servo motor 26 for driving the driving means 25.

In the double-speed mechanism 20, since the both ends of the belt 23 are fixed to the feed frame 2, if the low-speed movable frame 22 is slid in the right direction in FIG. 3, the high-speed movable frame 24 is slid in the same right direction relative to the low-speed movable frame 22. More specifically, one end of belt 23, which is at an upstream of advancing direction A, is fixed to end section 100u that is on an inner surface of feed frame 2. The other end of belt 23, which is at a downstream of advancing direction A, is fixed to the end section 100d that is on the same surface of feed frame 2 as end section 100u is positioned. Low-speed movable frame 23 is in a bar shape and arranged parallel and slidable to the feed frame. The frame 23 is further placed inside belt 23 surrounding the frame 23. Since belt 23 is flexible so that the frame 23 is able to reciprocatively slide upstream and downstream in direction A. High-speed movable frames 24 are arranged on belt 23. In the top view as seen in FIG. 3, the frames 24 are located below belt 23, which means that the frames 24 are at an opposite side of the belt from where the belt 22 is fixed. In other words, the frames 24 are disposed facing inside the apparatus 10 where press apparatus 51 is arranged. In FIG. 3, inside and outside are shown with respect to feed frame 2.

Since the high-speed movable frame 24 is slid relative to the low-speed movable frame 22 in this manner, an absolute speed of the high-speed movable frame 24 is a speed of two times the speed of the low-speed movable frame 22 at a sliding time of the high-speed movable frame 24. More detailed are explained here. In FIG. 3, two high-speed movable frames 24u and 24d, which are respectively at upstream and downstream in advancing direction A. When frame 22 moves toward the downstream, which means the right in FIG. 3, pulleys 22a also move right by the same distance as the frame 22. The distance is illustrated with W0 in the drawing. The movement of pulleys 22a deform the shape of belt 23 moving high-speed movable frames 24u and 24d also to the right. In that situation, based on the mechanism of pulley, the frames 24u and 24d move right two times greater than pulleys 22a move. The post-moving position of frames 24u is shown with 24u'. The post-moving position of frames 24d is shown with 24d'. The moving distances of frame 24u and 24d are shown with "W0×2." That is because, in view of a position of post-moving pulley 22a', belt 23 becomes short by inside section Sin and outside section Sout of the belt and the frames 24u and 24d are allowed to slide right by the sum of sections Sin and Sout.

The driving means 25 attached to low-speed movable frame 22 is arranged between the end sections 100u and 100d in advancing direction A, and between feed frame 2 and low-speed movable frame 22 in horizontal direction X that is perpendicular to vertical direction Z and advancing direction A, see FIG. 2 such that the driving means receplocates the frame 22 between the upstream and the downstream.

Figure 4:
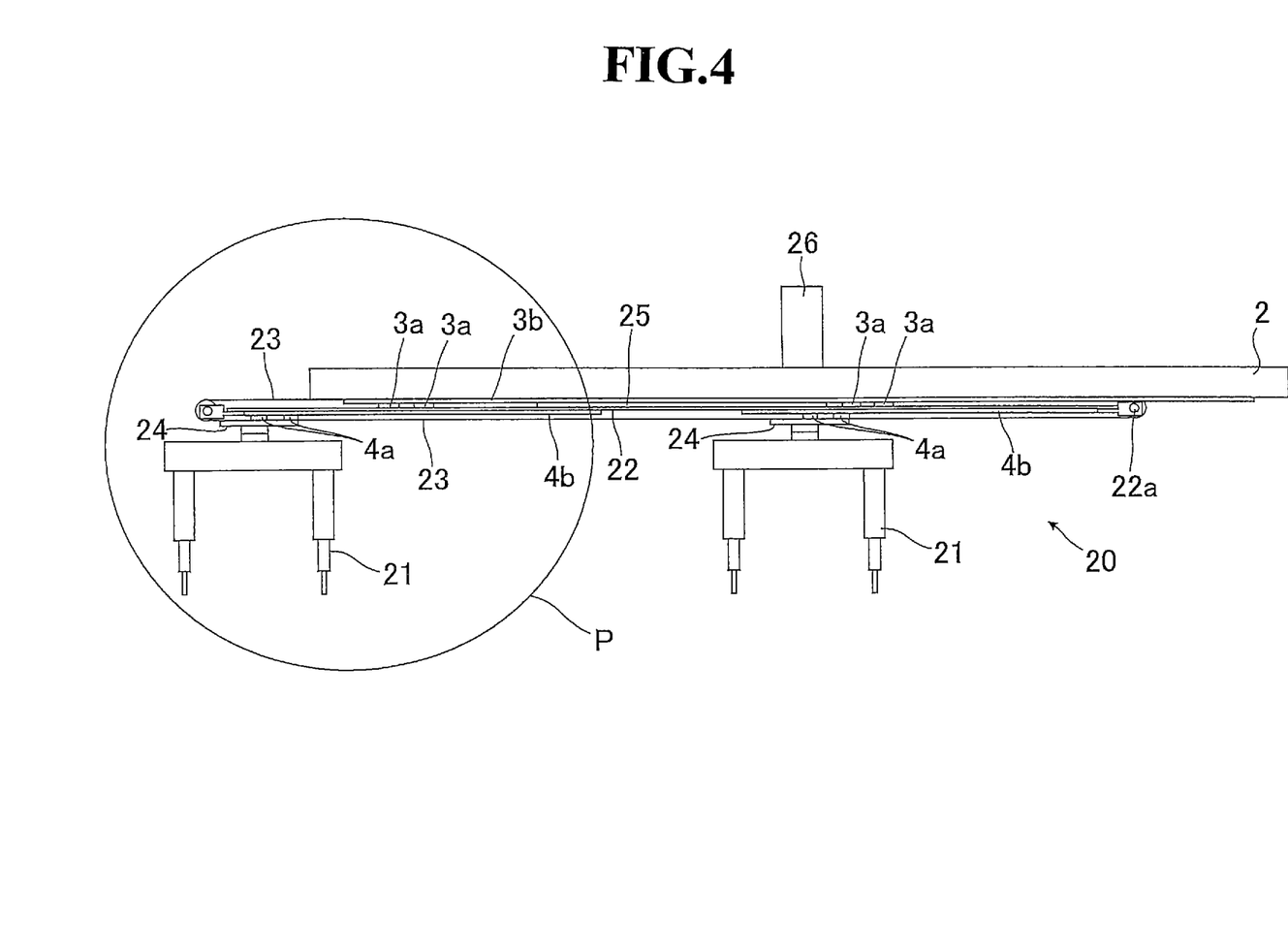
FIG. 4 is a front view showing the double-speed mechanism of the transportation apparatus according to this embodiment.
Figure 5:
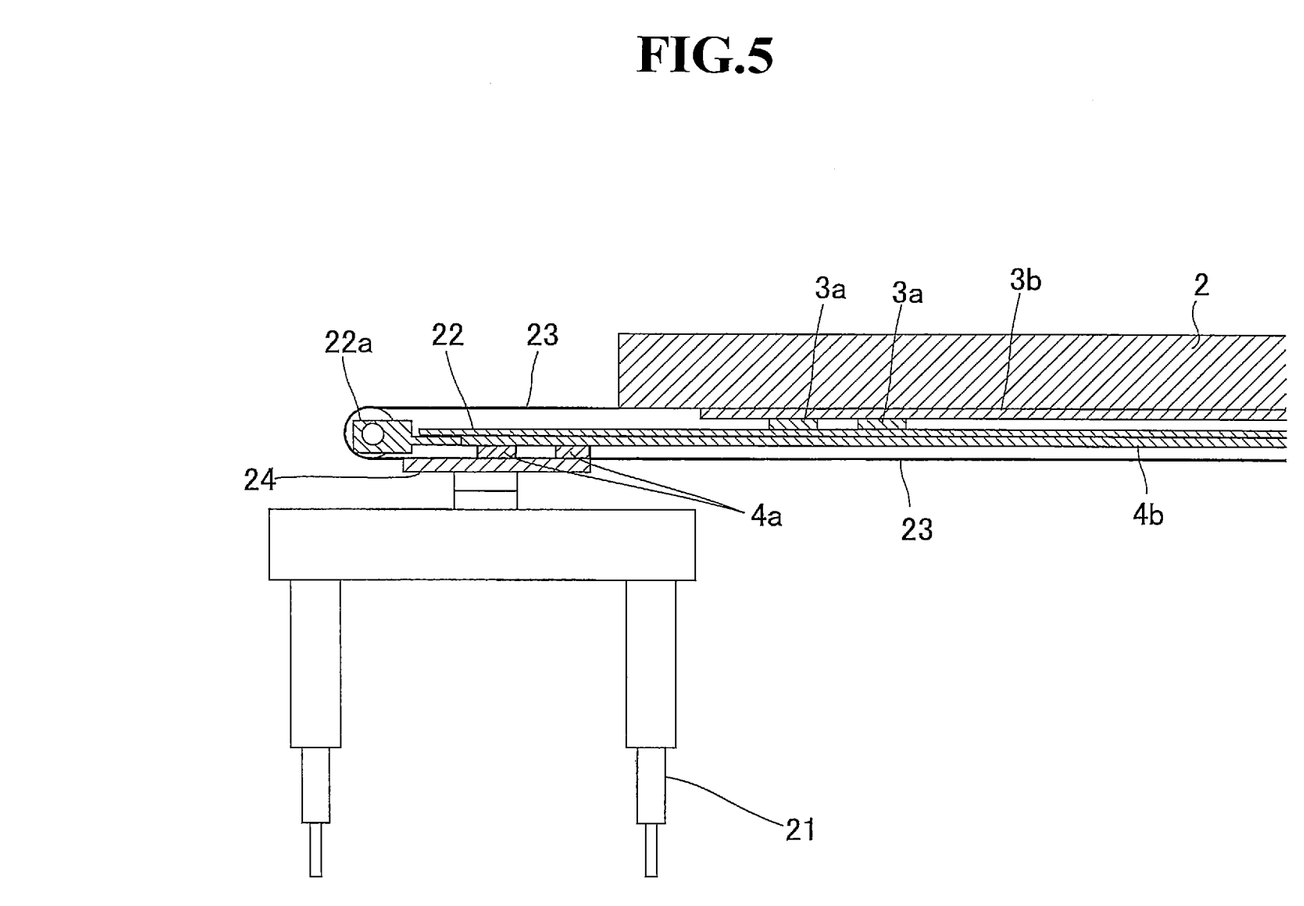
FIG. 5 is a view showing a section "P" in FIG. 4 in an enlarged fashion.

FIG. 4 is an upper view showing the double-speed mechanism of the transportation apparatus of this embodiment, and FIG. 5 is a view showing a section "P" in FIG. 4 in an enlarged fashion.

Incidentally, FIG. 5 is a view using a section symbol for convenience for understanding an operation relationship clearly.

As shown in FIG. 4 and FIG. 5, in the double-speed mechanism 20, the low-speed movable frame 22 is formed in a flat plate, and third guides 3a are provided on an upper face thereof (a face of the low-speed movable frame 22 positioned on the side of the feed frame 2).

Further, a third rail 3b is provided on a lower face of the feed frame 2 (a face of the feed frame 2 positioned on the side of the low-speed movable frame 22).

The low-speed movable frame 22 can be slid in the left and right directions relative to the feed frame 2 by attaching the third guides 3a to the third rail 3b of the feed frame 2 slidably.

The low-speed movable frame 22 is attached with the pulleys 22a at both ends thereof, and the belt 23 is provided so as to extend between the pulleys 22a at the both ends.

The belt 23 is fixed to the feed frame 2 at both the ends thereof, and fourth guides 4a are provided on the upper face of the belt 23 (a face of the belt 23 positioned on the side of the low-speed movable frame 22).

Further, the above-described low-speed movable frame 22 is provided with a fourth rail 4b on a lower face thereof (a face of the low-speed movable frame 22 positioned on the side of the belt 23).

The belt 23 can be slid in the left and right directions relative to the low-speed movable frame 22 by attaching the fourth guides 4a to the fourth rail 4b of the low-speed movable frame 22 slidably.

Incidentally, the belt 23 is attached with two high-speed movable frames 24 on an inner face thereof.

In the double-speed mechanism 20, the low-speed movable frame 22 is driven by the driving means 25.

As such a driving means 25, a rack and pinion apparatus is preferably used.

Therefore, arrangement is made possible even in a narrow space.

Further, the driving means 25 is controlled by a servo motor 26.

In the transportation apparatus 10, the slide of the low-speed movable frame 22 and the slide of the high-speed movable frame 24 are mechanically synchronized with each other.

Further, as described above, since all of the slides of the feed frame 2, the shift frame 1, and the double-speed mechanism 20 are performed by servo motor driving, it is possible to set speeds of the slides and the distances of the slides precisely.

In the transportation apparatus 10, each double-speed mechanism 20 is provided with two high-speed movable frames 24, and each high-speed movable frame 24 is provided with a grasping means 21 which can grasp a work.

Further, since a pair of the above-described double-speed mechanisms 20 are provided, the transportation apparatus 10 is provided with two pairs of grasping means, namely, four grasping means 21.

Returning to FIG. 1, since the double-speed mechanism 20 is provided with two pairs of grasping means, transportation of a work W from the heating furnace 50 to the press apparatus 51 and transportation of a work W from the press apparatus 51 to the cooling means 52 can be performed rapidly and stably.

Here, a transportation method of a work W using the transportation apparatus 10 will be described.

In the transportation method of a work W using the transportation apparatus 10, a work which has been heated by a heating means can be transported to the press apparatus disposed between the heating means and a cooling means and the work which has been pressed by the press apparatus can be transported to the cooling means.

First, the work W which has been heated in the heating furnace 50 is transported to a take-out position P1 by a heating-furnace conveyer 50a additionally provided in the heating furnace 50.

On the other hand, a work W which has been set in the press apparatus 51 is pressed.

In the transportation apparatus 10 put in a waiting state on the upstream side, the feed frames 2 are slid inward, and the grasping means 21 positioned on the upstream side grasp a work W at the taking-out position P1, the grasping means 21 positioned on the downstream side grasp another work W which has been pressed by the press apparatus 51, and both the works W are then lifted up by both the grasping means 21 according to upward sliding of the shift frames 1.

Next, the transportation apparatus 10 slides the low-speed movable frames 22 and the high-speed movable frames 24 of the double-speed mechanisms 20 on the downstream side at high speed.

At this time, slide of the low-speed movable frame 22 and slide of the high-speed movable frames 24 are moved in synchronism with each other.

At this time, since the high-speed movable frames 24 are slid relative to the low-speed movable frames 22, the high-speed movable frames 24 are slid at the absolute speed of two times the speed of the low-speed movable frames 22.

The shift frames 1 are slid downward, the grasping means 21 at the upstream side release the work W at the press section of the press apparatus while the grasping means 21 at the downstream side release the work W at a taking-in position P2 of the cooling apparatus 52, so that the works W are placed on the press section of the press apparatus 51 and the taking-in position P2, respectively.

Thereafter, the feed frames 2 are slid outward.

The transportation apparatus 10 slides the low-speed movable frames 22 and the high-speed movable frames 24 of the double-speed mechanisms 20 to the upstream side at a high speed.

At this time, also, since the high-speed movable frames 24 are similarly slid relative to the low-speed movable frames 22, the high-speed movable frames 24 are slid at the absolute speed of two times the speed of the low-speed movable frames 22.

On the other hand, the work W which has been placed on the press section of the press apparatus is pressed in the press section, while the work W which has been placed at the taking-in position P2 is transported to the cooling apparatus 52 by the cooling-apparatus conveyer 52a additionally provided in the cooling apparatus 52.

In the transportation method of the work W using the transportation apparatus 10 according to this embodiment, transportation from the hearing furnace 50 to the press apparatus 51 and transportation from the press apparatus 51 to cooling means 52 can be performed efficiently.

Though the preferred embodiment of the present invention has been described above, the present invention is not limited to the above-described embodiment.

The transportation apparatus 10 according to this embodiment performs transportation of a work W from the heating furnace 50 to the press apparatus 51 and transportation of a work W from the press apparatus 51 to the cooling means 52, but it is not required to dispose the heating furnace on the upstream side necessarily, while it is not required to dispose the cooling apparatus on the downstream side necessarily.

That is, the above-described transportation apparatus 10 can be applied to another mechanism as an apparatus which can transport a work at a high speed.

In the transportation apparatus 10 according to this embodiment, the rack and pinion apparatus is used as the driving means 25, but the driving means 25 is not limited to this apparatus and it may be a ball screw, a linear motor, or the like.

In the transportation apparatus 10 according to this embodiment, the slide of the low-speed movable frames 22 and the slide of the high-speed movable frames 24 are mechanically synchronized with each other, but the both are not required to be synchronized with each other necessarily.

In the transportation apparatus 10 according to this embodiment, two pairs of the high-speed movable frames 24 are provided in the double-speed mechanism 20, but a pair of the high-speed movable frames 24 may be provided and three or more pairs of the high-speed movable frames 24 may be provided.

INDUSTRIAL APPLICABILITY

The transportation apparatus of the present invention can be suitably used in a field of press working as an apparatus which can transport a work at a high speed.

The transportation apparatus of the present invention has a fast operating speed and can make an interference region with a press apparatus as small as possible.

REFERENCE SIGNS LIST

1 . . . shift frame,
1a . . . first guide,
1b . . . first rail,
2 . . . feed frame,
2a . . . second guide,
2b . . . second rail,
3a . . . third guide,
3b . . . third rail,
4 . . . strut,
4a . . . fourth guide,
4b . . . fourth rail,
10 . . . transportation apparatus,
20 . . . double-speed mechanism,
21 . . . grasping means,
22 . . . low-speed movable frame,
22a . . . pulley,
23 . . . belt,
24 . . . high-speed movable frame,
25 . . . driving means,
26 . . . servo motor,
50 . . . heating furnace,
50a . . . heating-furnace conveyer,
51 . . . press apparatus,
52 . . . cooling apparatus,
52a . . . cooling-apparatus conveyer,
100 . . . press mechanism,
A . . . advancing direction of work,
P1 . . . taking-out position,
P2 . . . taking-in position,
W . . . work

The invention claimed is:

1. A transportation apparatus to transport a work piece in an advancing direction (A) from an upstream to a downstream, the work piece being placed on a plane defined by the advancing direction and a horizontal direction (X) that is perpendicular to the advancing direction, comprising:

a pair of shift frames that are arranged parallel to each other in the horizontal direction, the shift frames synchronizing to slide only up and down in the vertical direction so that the shift frames move between an up position and an down position;

a pair of feed frames that are attached to the shift frames and arranged parallel to each other in the advancing direction, sandwiching a transportation path of the work piece along which the work piece is transported, the feed frames synchronizing to slide along the shift frames only to narrow and to broad a gap therebetween in the horizontal direction so that the feed frames move between a narrow position and a broad position, a pair of grasping means for grasping and releasing the work piece to transport, a pair of double-speed mechanisms that are attached to the feed frames, one of the feed frames having one of the double-speed mechanisms, to reciprocate the grasping means along the feed frames between an upstream position where the grasping means grasps the work piece by moving the feed frames to the narrow position and a downstream position where the grasping means releases the work piece by moving the feed frames to the board position, wherein each of the double-speed mechanisms comprises
a belt that is flexible, one end of the belt being fixed to an end section of the feed frame, and the other end of the belt being fixed to another end section of the feed frame that is positioned downstream from the end section,
a low-speed movable frame that is in a bar shape, arranged parallel to the feed frame, slidable along the feed frame and inside the belt such that the belt surrounds the low-speed movable frame,
a pair of pulleys that are arranged at both ends of the low-speed movable frame in the advancing direction such that the pulleys guide the belt, and
a driving means that reciprocates the low-speed movable frame between the upstream and the downstream,
a high-speed movable frame that is arranged on the belt, the high-speed movable frame being positioned at an opposite side from the end sections with respect to the low-speed movable frame in the horizontal direction, one of the grasping means being attached to the high-speed movable frame so that, when the low-speed movable frame is moved by the driving means by a distance (W0) either to the upstream or to the downstream in the advancing direction, the high-speed movable frame moves by two times greater than the distance (W0) in the same direction as the low-speed movable frame is moved,
wherein the work piece is pressed inside the pair of grasping means such that grasping portions that contact the work piece face each other.

2. The transportation apparatus according to claim 1, wherein
the work piece which has been heated by the heating means is transported to a press apparatus arranged between the heating means and a cooling means, and
the work piece which has been pressed by the press apparatus is transported to the cooling means.

3. The transportation apparatus according to claim 1, wherein the driving means is a rack and pinion apparatus.

4. The transportation apparatus according to claim 1, wherein the driving means is positioned between the end sections in the advancing direction and at the same side as the end sections with respect to the low-speed movable frame in the horizontal direction.

5. The transportation apparatus according to claim 1, wherein a heating furnace for heating the work piece, a press apparatus for pressing the work piece, and a cooling apparatus for cooling the work piece are arranged in this order along the transportation path from the upstream to the downstream, and the press apparatus is positioned inside an area that is determined by the shift frames and the feed frames in a view from the vertical direction.

* * * * *